UNITED STATES PATENT OFFICE.

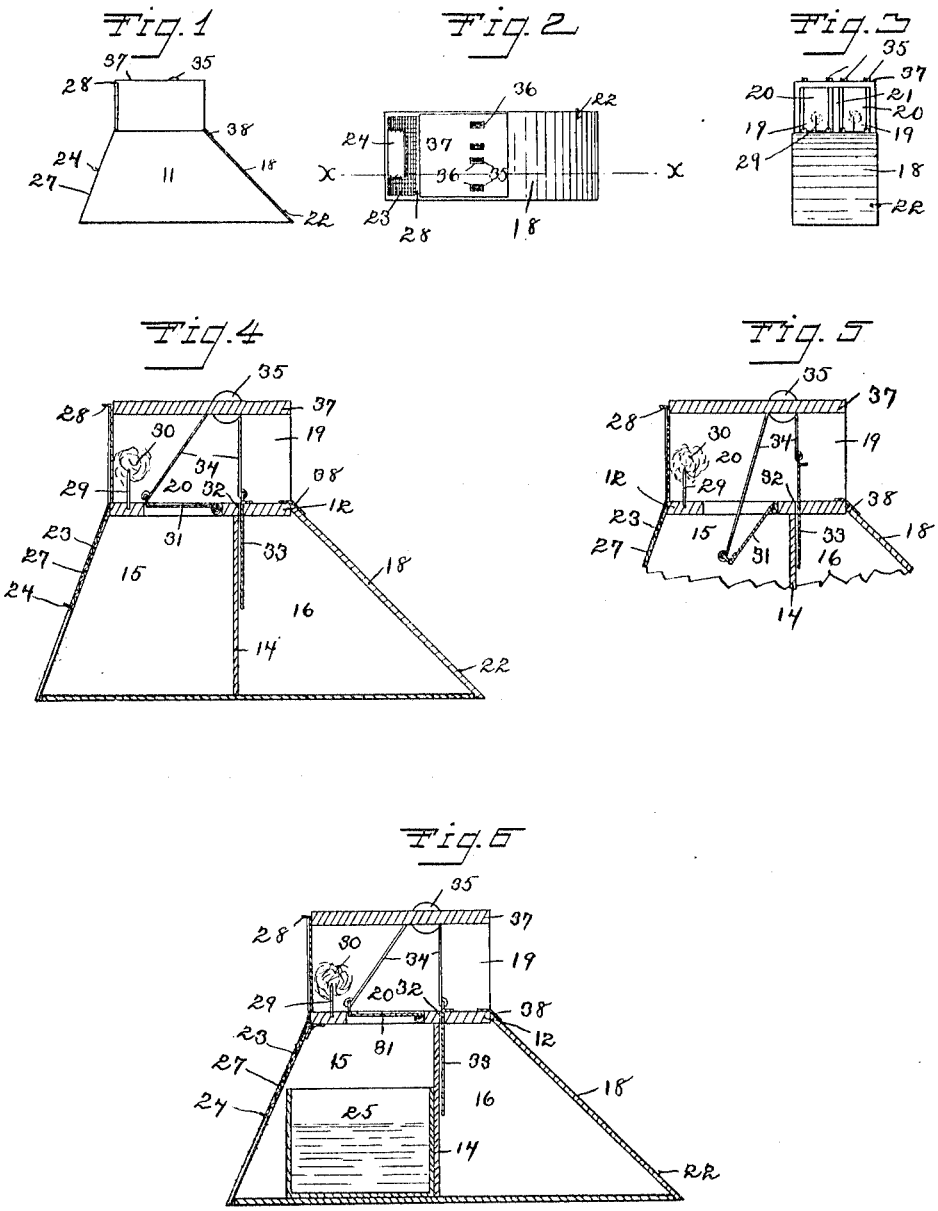

EDUARD KREID, OF NEW BRITAIN, CONNECTICUT.

MOUSE-TRAP.

1,117,402. Specification of Letters Patent. Patented Nov. 17, 1914.

Application filed April 29, 1914. Serial No. 835,135.

*To all whom it may concern:*

Be it known that I, EDUARD KREID, a citizen of Austria, residing at New Britain, in the county of Hartford and State of Connecticut, have invented certain new and useful Improvements in Mouse-Traps, of which the following is a specification.

My invention relates to improvements in mouse traps, and the object of my improvement is simplicity and economy in construction and convenience and efficiency in use.

In the accompanying drawing:—Figure 1 is a side elevation of my improved mouse trap. Fig. 2 is a plan view of the same. Fig. 3 is a rear elevation of the same. Fig. 4 is a sectional view, on an enlarged scale, on the line $x$ $x$ of Fig. 2. Fig. 5 is a similar fragmentary view, with the parts in a different position. Fig. 6 is a view similar to Fig. 4, showing a modified form of receptacle for the mice.

My improved mouse trap comprises a box-like casing having parallel side walls 11 and divided by a floor 12 into an upper and lower portion. The upper portion serves as the entrance chamber 20 and the lower portion is divided by a vertical partition wall 14 into a receiving chamber 15 at the front end and an auxiliary chamber 16 at the rear. The end walls for the lower portion exterior to the floor 12 incline downwardly and outwardly relatively to the said floor, so that the base 17 is appreciably larger than the floor 12. The inclined top wall or roof 18 of the exposed portion of the auxiliary chamber 16 serves as an inclined way leading to the inlet opening or entrance 19 to the entrance chamber 20. As shown my trap is duplex there being two entrances 19 and two similar entrance chambers 20, separated by a longitudinal partition wall 21. The inclined top wall 18 of the auxiliary chamber 16 is hinged at the upper end, as shown at 21, and serves as a swinging cover for the said chamber, and the same may be secured by a latch 22 near the lower end. The receiving chamber 15 is closed at the front end by netting 23, and is provided with a sliding door 24 to permit removal of the mice.

In the modification shown in Fig. 6 a tank 25 with water is positioned in the said chamber, and in such case the end wall 27 is hinged suitably to permit the removal of the said tank.

The entrance chamber 20 is closed at the front end by a sliding door 28 to give access to the pins 29 projecting upwardly from the floor 12 and on which is mounted the bait 30.

About the middle portion of the floor 12 is an opening in each entrance chamber 20 extending preferably essentially entirely across the same and of sufficient length to admit a mouse, and which is normally closed by a trap door 31 hinged by its rear end. Adjacent the rear or hinged end of the trap door 31 there is a cross slit 32 in the floor 12 in which is positioned a vertically sliding door 33, and which is normally in depressed position, and with the upper end essentially flush with the floor 12. A plurality of cords 34 connect the said upper end of the sliding door 33 with the front or free end of the trap door 31, and which cords intermediate the ends pass over suitable guide pulleys 35 at the upper portion of the entrance chamber 20. As shown the guide pulleys 35 are operatively supported in slots 36 in the roof 37 of the entrance chamber 20.

The sliding door 33 serves as a counter weight for the trap door 31 and tends to hold the same in the closed position. Tilting the trap door 31, as by the weight of a mouse that happens to alight thereon, serves to raise the sliding door 33 and thereby to close the entrance 19 to the receiving chamber 20, and would prevent egress therefrom, and with the trap door sufficiently inclined the mouse would drop to the receiving chamber 15. The trap door 31 is preferably made of sheet metal so that the mouse would readily slide off from the same. The sliding door 33 however has additional function to that described, and which follows from the position of the same adjacent the rear end of the trap door 31, and this is that a slight movement of the trap door serves to raise the sliding door correspondingly, and in case the mouse was not fully on the trap door the mouse would be struck by the rising door 33 and would be alarmed and incited to move fully on the trap door and operate the same in the manner described.

I claim as my invention:—

A mouse trap comprising a casing, a floor dividing the said casing into an entrance chamber at the upper portion and a receiving chamber at the lower portion, the said casing having an inlet in the side wall leading to the said entrance chamber, the said floor having an opening leading from the entrance chamber to the said receiving chamber, and also having a slot adjacent the said opening, a trap door controlling the passage through the said opening, a sliding door positioned in the said slot, a guide pulley pivotally mounted at the upper part of the said casing, and a cord passing over the said guide pulley and having the ends connected the one to the said trap door and the other to the said sliding door whereby the weight of the said sliding door tends to keep the said trap door closed and when the said trap door is opened the said sliding door will be raised.

EDUARD KREID.

Witnesses:
 LOUIS M. SCHMIDT,
 ROGER W. EDWARDS.